3,012,909
FUNGUS RESISTANT SHEET MATERIAL AND METHOD OF MAKING THE SAME

Leo J. Weaver, Creve Coeur, Mo., assignor to Monsanto Chemical Company, St. Louis, Mo., a corporation of Delaware
No Drawing. Filed Jan. 28, 1959, Ser. No. 789,473
12 Claims. (Cl. 117—138.5)

This invention relates to fungus resistant compositions and to methods of inhibiting the natural growth of fungus. More specifically, the invention provides a new and very effective fungicide capable of ready use in the treatment of soils, textiles, wood, plastics and other compositions subject to fungus attack.

The art of fungus control is well established and it is common place to incorporate fungicidal compounds into articles of commerce which are frequently subject to discoloration or more serious damage through fungus growth. Thus textiles, particularly in awnings, tents, tarpaulins and other fabric articles exposed to outdoor weather; plastics, particularly the cellulose esters and ethers as in photographic film and plastics generally for outdoor use, paints and other exterior surface coating films, wood impregnants, and other products are frequently compounded with active fungicides for prolonging useful life of these articles and preventing unsightly discolorations.

Furthermore, naturally occurring fungus in the soil destroys agricultural products and other vegetation, and it is well known to treat the soil with fungicides in advance to prevent the growth of injurious fungus or to treat areas known to be fungus infested for the control or elimination of the undesirable organisms. Suitable solutions or suspensions of the fungicides are applied directly to the soil or to the plants growing in the infested area. The fungicides for this use are prepared as concentrated solutions or emulsions and as wettable or soluble powders for ready use.

Frequently compounds toxic to fungus are also toxic to plant and animal life, especially when they are water-soluble. Often fungicides must be effective in trace quantities and must not have deleterious color or opacity, for example when used in transparent films. When used in coating compositions, the fungicide must not alter the color, texture or drying properties of the said composition. These and other problems make the choice of fungicides difficult and the use precarious. The exacting requirements frequently justify the use of very costly materials.

In the use of fungicides it has frequently been observed that destruction of fungus in soil, wood or in other natural habitat or in an article of commerce, the natural balance of microbiotic life is upset and then the population of destructive bacteria greatly increases. For this reason an active fungicide may not produce an overall beneficial result. Thus to be of general utility a good fungicide should also have bactericidal properties.

Accordingly, the fundamental purpose of the present invention is to provide a new fungicidal composition. A further purpose is to provide methods of minimizing fungal destruction in various articles of commerce having improved resistance to fungal attack. A still further purpose of this invention is to provide a bactericide, and especially one which is effective simultaneously as an active fungicide. Other purposes of the invention will be apparent from the following description.

In accordance with this invention, it has been found that compounds of the following type are unusually effective fungicides:

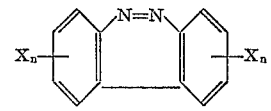

wherein X is selected from the class consisting of halogen atoms, alkyl radicals containing up to three carbon atoms, and halogen substituted alkyl radicals having up to three carbon atoms, and $n$ is an integer from zero (0) to two (2) inclusive.

Suitable compounds of this type are benzo(c)cinnoline and the various substituted benzo(c)cinnolines including:

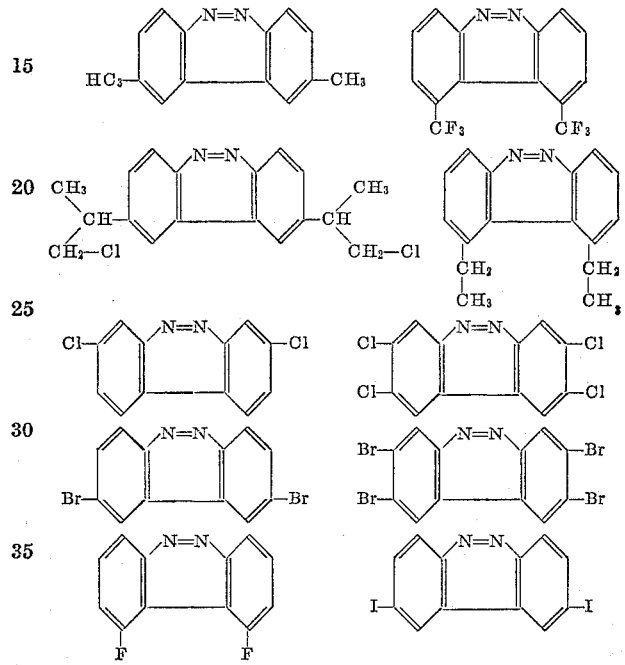

These compounds may be prepared from aromatic compounds containing a nitro group and a chlorine group substituted on adjacent carbon atoms by the condensation in the presence of a metallic copper catalyst followed by reduction with sodium sulfide, and finally further reduced by stannous chloride. The following reaction is believed to take place:

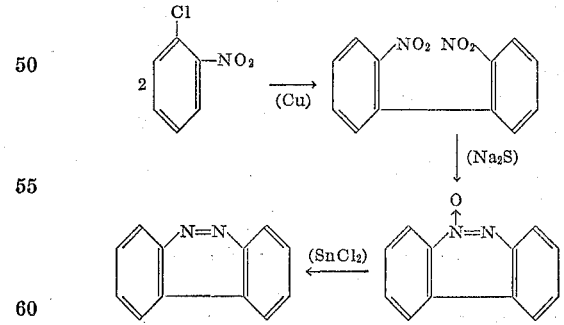

This compound may also be prepared by other methods known and described in the published literature.

The halogen substituted derivatives may be prepared from the analogous o-nitrochloro aromatics having additional halogen substituents in the desired relative position. The condensation also takes place in the presence of a copper catalyst and the reduction by means of sodium sulfide and stannous chloride.

The new compounds may be used for the impregnation of cloth and other textiles, lumber and other wood products and soils in the manner well known to the art. Being soluble in many organic substances, the products may be dissolved in the vehicle of a paint composition. The benzo(c)cinnoline and substituted compositions may also be soluble in many plastic compositions. Thus the use of these compositions by conventional fungus control procedures is readily apparent. The new compounds may be prepared for use by dissolution in a suitable solvent or by suspension in another liquid carrier. Compositions may be formulated with wetting agents to provide a wettable powder for aqueous emulsion use or it may be prepared in a concentrated solution in a suitable organic solvent carrier. Other methods of application and incidental formulations will be apparent to one skilled in the use of fungicidal compositions.

Further details in the preparation of the compounds and their novel uses are set forth with respect to the following examples.

*Example 1*

An agar culture of *Aspergillus niger* was treated with benzo(c)cinnoline at various dilutions. It was found that a substantial inhibition of the fungus occurred even with dilutions of one part in 10,000.

*Example 2*

To establish the bacteriostatic properties of benzo(c)-cinnoline the organism *Micrococcus pyogenes* (var. *aureus*) was treated in a culture at various concentrations of the bactericide. At one part in 10,000 the bacterial growth was controlled.

*Example 3*

The test procedure of Example 1 was repeated, except the benzo(c)cinnoline was replaced by the product prepared by condensation of o,p-dichloronitrobenzene followed by reduction. The *Aspergillus niger* culture was also inhibited by the chlorine containing benzo(c)cinnoline.

When using the benzo(c)cinnoline and its halogen substituted products in the treatment of plastics, paint compositions, wood products and textiles, it has been found that compositions from 0.1 to 10% are very effective. The preferred usage of the benzo(c)cinnoline and derivatives involves concentrations of from 0.01 to 5% by weight based on the composition being treated. Both the smaller and greater proportions of the fungicides are useful in protecting a wide variety of cellulosic or proteinaceous materials, such as fiberboard, leather, casein products, including adhesives and coating compositions. Animal and vegetable oils and fats may similarly be preserved by the incorporation of small amounts of benzo(c)cinnoline.

This application is a continuation-in-part of application Serial No. 387,543, filed October 21, 1953, by Leo J. Weaver, which application is now abandoned.

What is claimed is:

1. The method of making organic sheeted material of the class consisting of fabrics and films, which comprises incorporating in said sheeted material a compound having the structure

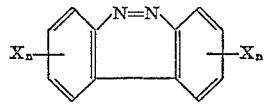

wherein X is selected from the class consisting of halogen atoms, alkyl radicals containing up to three carbon atoms and halogen substituted alkyl radicals having up to three carbon atoms, and n is an integer from zero (0) to two (2) inclusive.

2. The method of protecting a textile from fungus which comprises dispersing in the textile a compound having the structure

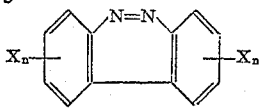

wherein X is a halogen atom and n is an integer from zero (0) to two (2) inclusive.

3. The method of protecting an organic film from fungus which comprises dispersing in the said film a compound having the structure

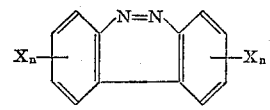

wherein X is a halogen atom and n is an integer from zero (0) to two (2) inclusive.

4. A method of making organic sheeted material of the class consisting of fabrics and films resistant to fungi which comprises incorporating in the said sheeted material benzo(c)cinnoline.

5. A method of protecting a textile from fungus which comprises dispersing in the textile benzo(c)cinnoline.

6. A method of protecting organic films from fungus which comprises dispersing in the organic films benzo(c)cinnoline.

7. Fungus resistant organic sheeted material of the class consisting of fabrics and films having dispersed therein a compound having the structure

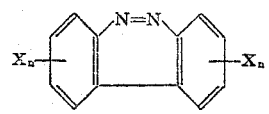

wherein X is selected from the class consisting of halogen atoms, alkyl radicals containing up to three carbon atoms and halogen substituted alkyl radicals having up to three carbon atoms, and n is an integer from zero (0) to two (2) inclusive.

8. A fungus resistant textile which has incorporated therein a compound having the structure

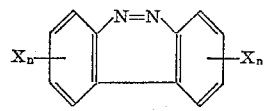

wherein X is a halogen atom and n is an integer from zero (0) to two (2) inclusive.

9. A fungus resistant organic film having dispersed therein a compound having the structure

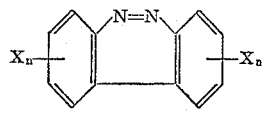

wherein X is a halogen atom and n is an integer from zero (0) to two (2) inclusive.

10. A fungus resistant organic sheeted material of the class consisting of fabrics and films having dispersed therein benzo(c)cinnoline.

11. A fungus resistant textile having incorporated therein benzo(c)cinnoline.

12. A fungus resistant organic film having dispersed therein benzo(c)cinnoline.

References Cited in the file of this patent

UNITED STATES PATENTS 2,643,252    Ross ------------------ June 23, 1953

OTHER REFERENCES

U.S. Dept. Agriculture, Bureau of Entomology and Plant Quarantine, Bulletin No. E–425 (March 1938), pages 3 and 12.

U.S.D.A. Circular No. 523 (May 1936), pages 1, 2, 3 and 7.

Youman et al.: The Bacteriostatic Activity of 3500 Organic Compounds for *Mycobacterium tuberculosis* var. *Hominis*, 1953, pages 1 and 567.